United States Patent [19]

Carteron et al.

[11] Patent Number: 4,955,541
[45] Date of Patent: Sep. 11, 1990

[54] TWO DIMENSIONAL NOZZLE FOR A TURBOJET ENGINE

[75] Inventors: Olivier Carteron, Maisse; Gérard E. A. Jourdain, Corbeil Essonnes, both of France

[73] Assignee: Societe Nationale d'Etude et de Construction de Moteurs d'Aviation S.N.E.C.M.A., Paris, France

[21] Appl. No.: 407,908

[22] Filed: Sep. 15, 1989

[30] Foreign Application Priority Data

Sep. 28, 1988 [FR] France ................... 88 12648

[51] Int. Cl.[5] .............................................. F02K 1/12
[52] U.S. Cl. ........................... 239/127.1; 239/265.37; 239/265.39
[58] Field of Search ........... 239/127.1, 265.33, 265.37, 239/265.39; 60/242, 271

[56] References Cited

U.S. PATENT DOCUMENTS

| | | | |
|---|---|---|---|
| 2,880,575 | 4/1959 | Scialla | 239/265.37 |
| 2,928,238 | 3/1960 | Hawkins, Jr. | |
| 3,837,579 | 9/1974 | Camboulives et al. | 239/265.39 |
| 4,361,281 | 11/1982 | Nash | 239/265.37 |
| 4,641,782 | 2/1987 | Woodward | 239/265.37 X |
| 4,641,783 | 2/1987 | Camboulives | 239/265.39 |
| 4,778,109 | 10/1988 | Jourdain et al. | 239/265.27 |
| 4,817,871 | 4/1989 | Berneuil et al. | 239/265.39 |
| 4,819,876 | 4/1989 | Thayer | 239/265.39 |

FOREIGN PATENT DOCUMENTS

| | | |
|---|---|---|
| 424000 | 5/1972 | Australia . |
| 180534 | 5/1986 | European Pat. Off. . |
| 287499 | 10/1988 | European Pat. Off. . |
| 2189642 | 1/1974 | France . |
| 2602274 | 5/1988 | France . |
| 1141051 | 1/1969 | United Kingdom . |

Primary Examiner—Andres Kashnikow
Assistant Examiner—William Grant
Attorney, Agent, or Firm—Bacon & Thomas

[57] ABSTRACT

The two-dimensional adjustable nozzle according to the invention is a generally rectangularly shaped nozzle having a pair of opposite, fixed sidewalls defining the lateral boundaries of the nozzle and adjustable flap assemblies extending between the lateral walls and defining the upper and lower boundaries of the nozzle. The adjustable flap assemblies each have an interior flap and an exterior flap associated with a rocking lever which, in turn, is connected to an actuating mechanism. The actuating mechanism, which may be a jack screw, is located within the lateral sidewalls and is controlled by a rotatable cable. Rotation of the jack screw shaft which is connected to the rocking levers, causes the rocking levers to move in a direction generally transverse to the longitudinal axis of the nozzle to thereby adjust the angular positions of the interior and exterior flaps.

9 Claims, 3 Drawing Sheets

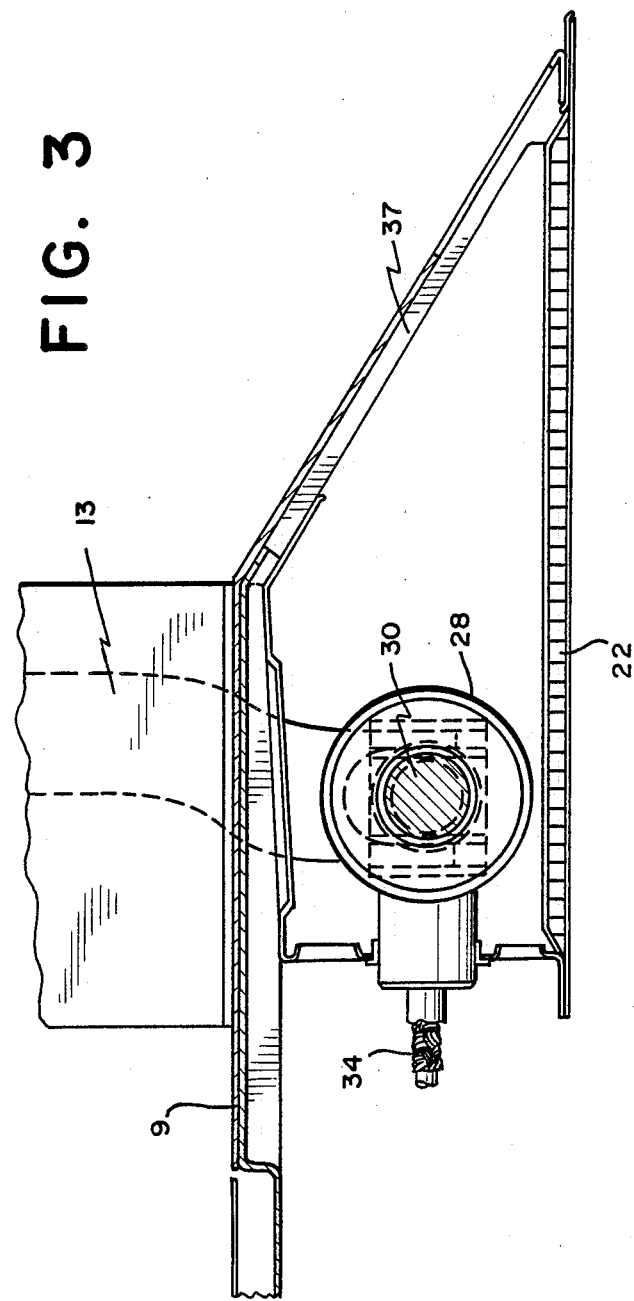

TWO DIMENSIONAL NOZZLE FOR A TURBOJET ENGINE

BACKGROUND OF THE INVENTION

The present invention relates to a turbojet engine nozzle of the two-dimensional, adjustable cross-section type.

Adjustable turbojet engine nozzles are well known in the art and comprise either a two-dimensional adjustable type, or a type formed by an annular ring of adjustable flaps. Typical examples of such annular rings of adjustable flaps can be found in French Application No. 2 602 274 as well as U.S. Pat. Nos. 4,641,783 and 4,817,871. The objective in each of these structures is to obtain the optimum jet thrust, while also assuring adequate performance in the area of specific fuel consumption. These objectives are achieved by adjusting the cross section of the nozzle to obtain optimum thrust and specific fuel consumption for each specific operational condition of the jet engine.

For certain applications, the two-dimensional adjustable nozzle type has proven to be beneficial over the annular ring of adjustable flaps due to its less complicated and simpler construction which reduces the production and maintenance costs of jet engines incorporating these types of nozzles. The two-dimensional adjustable nozzles typically comprise a pair of opposite, fixed walls defining the lateral boundaries of the nozzle and a pair of opposite, adjustable flaps defining the upper and lower boundaries of the nozzle. The cross section of the nozzle is adjusted by varying the angle of the adjustable flaps. Typical examples of this type of nozzle can be found in European patent application 0 180 534 and U.S. Pat. No. 4,778,109.

Since the number of flaps in the two-dimensional adjustable nozzle is less than the number of flaps in an annular ring of adjustable flaps, and, consequently, the area of the flaps are larger, the pressures exerted on the flaps by the exhaust gases passing through the nozzle are greater than those in the multi-flap annular ring nozzle. This has required two-dimensional nozzles to be structurally reinforced to withstand the increased gas pressure forces. This has resulted in the structures becoming unduly heavy, since such reinforcement must also compensate for the increased stress concentration points caused by the generally rectangular shape of such nozzles.

SUMMARY OF THE INVENTION

The two-dimensional adjustable nozzle according to the invention is a generally rectangularly shaped nozzle having a pair of opposite fixed sidewalls defining the lateral boundaries of the nozzle and adjustable flap assemblies extending between the lateral walls and defining the upper and lower boundaries of the nozzle. The adjustable flap assemblies each have an interior flap and an exterior flap associated with a rocking lever which, in turn, is connected to an actuating mechanism. The actuating mechanism, which may be a jack screw, is located within the lateral sidewalls and is controlled by a rotatable cable. Rotation of the jack screw shafts, which are connected to the rocking levers, causes the rocking levers to move in a direction generally transverse to the longitudinal axis of the nozzle to thereby adjust the angular positions of the interior and exterior flaps.

The jack screws and the rocking levers form a rigid structure around the nozzle which compensates for the pressure forces exerted on the flaps by the exhaust gases passing through the nozzle. The structure also avoids transferring the forces exerted thereon by the exhaust gases into the fixed structure of the jet exhaust duct and the structure of the nozzle, thereby enabling these structures to be formed without reinforcements.

The sole remaining forces exerted on the nozzle by the exhaust gases are those in an axial direction which may be easily compensated for by the attachment of the flaps to the turbojet engine exhaust duct.

BRIEF DESCRIPTION OF THE DRAWINGS

FIG. 3 is a partial top view taken in the direction of arrow F in FIG. 1.

DETAILED DESCRIPTION OF THE PREFERRED EMBODIMENT

Figure 1:
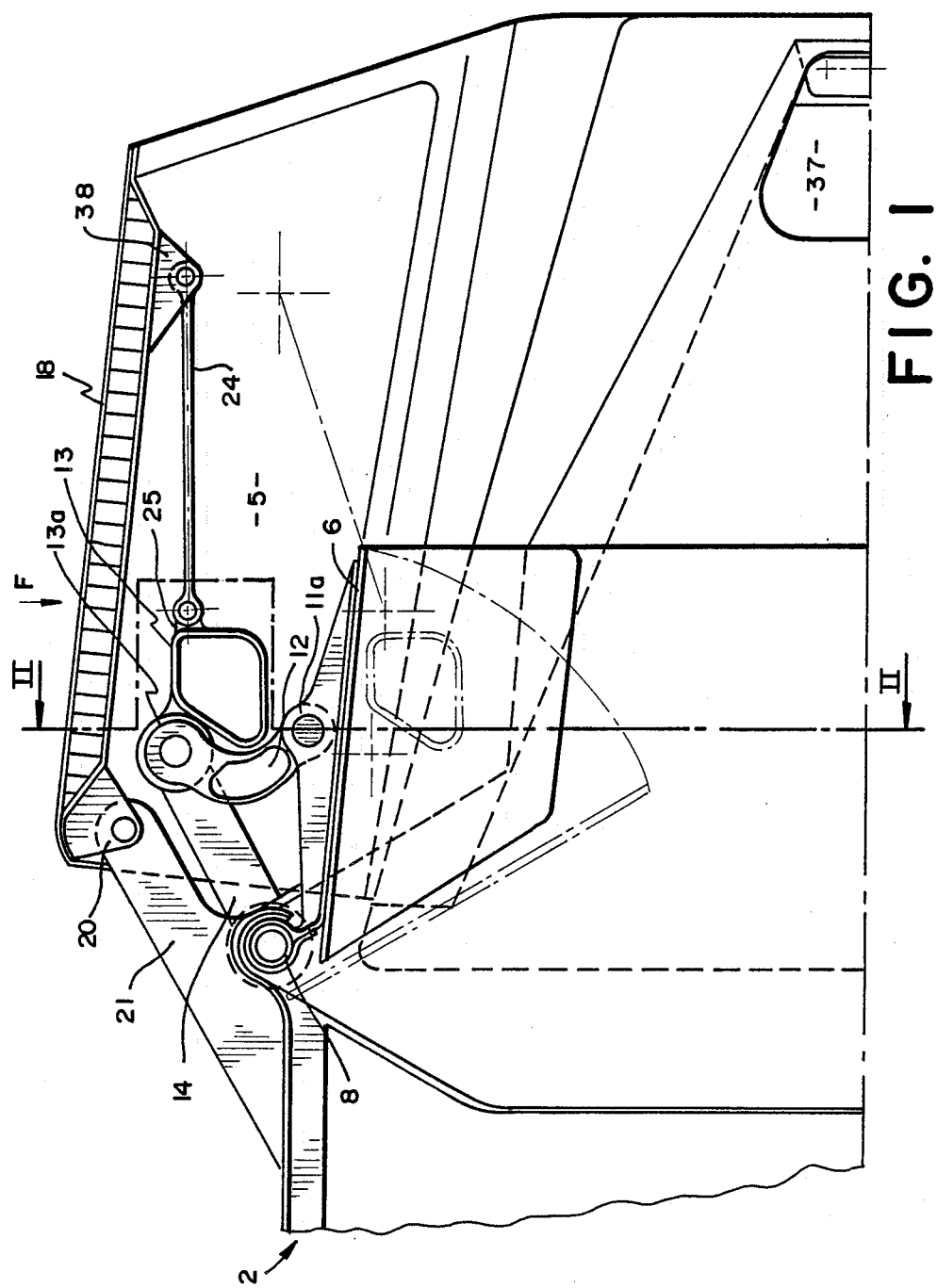
FIG. 1 is a partial, sectional view taken in a longitudinal direction through an exhaust nozzle according to the invention.
Figure 2:
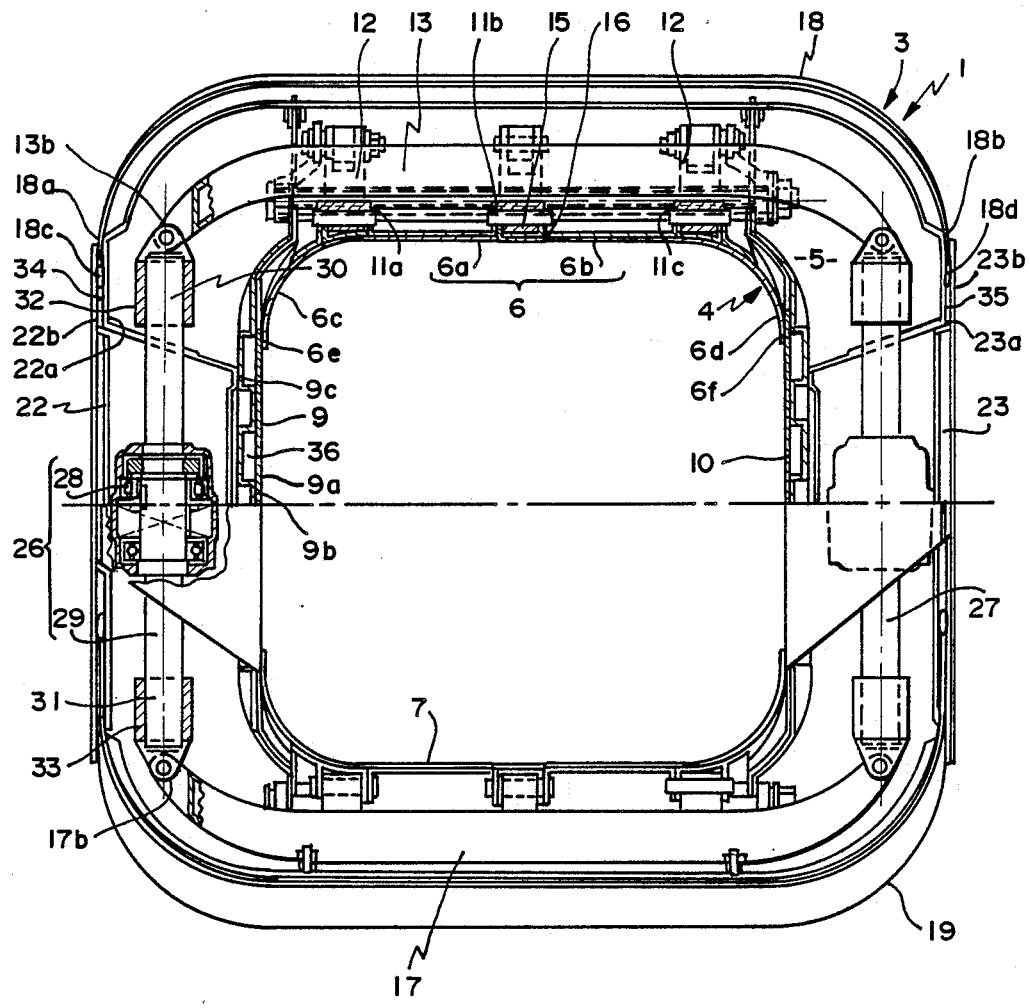
FIG. 2 is a cross sectional view taken along line II—II in FIG. 1.

As illustrated in FIGS. 1-3, the two-dimensional adjustable nozzle according to the invention comprises a turbojet nozzle 1 mounted at the downstream end of the turbojet engine exhaust gas duct 2 which comprises an exterior structure 3 and an interior structure 4. Each of the structures has a generally rectangular or square cross section with the interior structure defining the boundaries of the exhaust gas flow through the nozzle. The interior structure 4 is located inwardly of the exterior structure 3 so as to define a space 5 therebetween.

The interior structure 4 comprises interior flaps 6 and 7, extending in a generally horizontal orientation between interior walls 9 and 10 of the lateral wall structures. The interior flaps 6 and 7 are each attached to a downstream end of the exhaust duct 2 by pivoting attachments 8. Interior lateral walls 9 and 10 also extend from the downstream end of exhaust duct 2, but are fixed with respect to the duct.

Each of the interior flaps 6 and 7 comprises first and second portions separated along a line extending generally parallel to the longitudinal axis of the nozzle. These portions are illustrated as 6a and 6b in FIG. 2 and have overlapping edge portions 15 and 16 extending along their line of separation. Half flap portion 6a is attached to levers 12 by pivots 11a and 11b, respectively. Levers 12 are, in turn, pivotally attached to rocking lever 13 at pivot 13a. Pivot 13a also pivotally attaches rod 14 to the rocking lever 13. Rod 14 is pivotally attached to the downstream end of duct 2 at its opposite end on the same axis as pivoting attachments 8.

Similarly, half flap portion 6b is attached to a lever 12 by pivot 11c. Lever 12 is, as previously discussed, attached to rocking lever 13 which extends across the flap portions 6a and 6b between the interior flap 6 and the exterior flap 18, as illustrated in FIG. 2. In similar fashion, interior flap 7 is constructed as two half flaps each connected to rocking lever 17.

The external structure 3 is defined by exterior flaps 18 and 19 extending between exterior sidewalls 22 and 23 of the lateral wall structure. Exterior flaps 18 and 19 extend generally parallel to the interior flaps 6 and 7, across the nozzle and are attached to the downstream end of exhaust duct 2 by pivot means connecting flange 20 and bracket 21 fixedly attached to the exhaust duct 2.

The exterior walls 22 and 23 extend generally parallel to interior walls 9 and 10 and are, in similar fashion, fixedly attached to the exhaust duct 2. Exterior flap 18 is also connected to rocking lever 13 via rod 24 which is pivotally attached to the rocking lever 13 at 25 and has its opposite end pivotally attached to flange 38 extending from exterior flap 18. Exterior flap 19 is similarly attached to rocking lever 17.

In the space 5 between interior walls 9 and 10, and exterior walls 22 and 23, respectively, jack screws 26 and 27 are mounted so as to extend generally transverse to the longitudinal axis of the nozzle. Each of the jack screws comprises a housing 28 having a rotatable shaft 29 extending from both sides thereof. Rotatable shaft 29 is connected, in known fashion to a known type of gear drive system such that it may be selectively rotated in either direction. The shaft 29 has oppositely threaded portions 30 and 31 which are threadingly engaged with collars 32 and 33, respectively. The collars 32 and 33 are pivotally attached to the ends 13b and 17b of rocking levers 13 and 17, respectively. Jack screw 27 is similarly attached to the opposite ends of rocking levers 13 and 17.

Since the ends 30 and 31 are oppositely threaded, rotation of the shaft 29 in one direction will cause the rocking levers 13 and 17 move apart, while rotation in the opposite direction will cause the rocking levers to move towards each other. The rocking levers and the jack screws form a rigid frame around the nozzle structure and also serve as a control means to adjust the positions of the movable flaps.

Housing 28 of each jack screw 26 and 27 is connected by a flexible cable 34 to the central control of the nozzle device (not shown). Rotation of the flexible cable 34 causes rotation of the shaft 29, in known fashion, such that the collars 32 and 33 and, consequently, the rocking levers 13 and 17 are moved either toward each other or away from each other. Such movement of the rocking levers 13 and 17, which takes place in a plane extending substantially transverse to the longitudinal axis of the nozzle, causes interior flaps 6 and 7 to pivot toward each other, to close the nozzle, or away from each other to open the nozzle. Similar pivotal movements of exterior flaps 18 and 19 also take place due to their interconnection with the rocking levers 13 and 17, respectively.

The positions of the flaps 6 and 18, as well as those of levers 12, rocking levers 13 and rod 24 are shown in solid lines in FIG. 1 to indicate the open positions. The same elements are shown in broken or dashed lines to show their positions when the interior flap 6 is in the closed position.

Each of the interior half flaps 6a and 6b may be laterally displaced on its pivotable supports independently of the other. The overlapping edge portions 15 and 16 will prevent the leakage of any exhaust gases between the flap portions 6a and 6b. Each of the flap portions 6a and 6b defines a curved edge portion 6c and 6d, respectively which slidably bears against the interior surface of interior walls 9 and 10, as illustrated in FIG. 2. The ends 6e and 6f of the curved edge portions are biased into sealing contact with the interior walls 9 and 10 by the pressure exerted on them by the exhaust gases passing through the nozzle.

The lateral edges of exterior flaps 18 and 19 also define curved edge portions, such as 18a and 18b, each of which have a sealing flange in the form of a pad 18c or 18d which is slidably received in the space between bifurcated portions 34 and 35 of exterior walls 22 and 23. The bifurcated portions, denoted by 22a, 22b and 23a, 23b are formed on the upper and lower edges of the exterior walls to slidably receive the curved edge portions of the exterior flaps 17 and 18.

The interior walls 9 and 10 may be defined by inner and outer panels, illustrated as 9a and 9b in FIG. 2. The inner panel 9a may be formed of a ceramic material of the SiC-SiC type while the outer panel 9b may be formed of a composite material. The outer panel 9b may have ribs 9c formed thereon to define cooling passages 36 extending along the panels 9 and 10 to allow the circulation of cooling air therethrough. The cooling passages 36 may open into orifices 37 at the downstream ends of panels 9 and 10, respectively, to discharge the cooling air into the primary gas flow being discharged from the nozzle.

The foregoing description is provided for illustrative purposes only and should not be construed as in any way limiting this invention, the scope of which is defined solely by the appended claims.

We claim:

1. A two dimensional nozzle for a turbojet engine having a gas exhaust duct with a downstream end comprising:
   (a) a pair of stationary, opposite lateral wall structures, defining the lateral boundaries of the nozzle, each having an interior wall and an exterior wall defining a space therebetween;
   (b) a pair of movable, opposite flap assemblies extending between the lateral wall structures to define the upper and lower boundaries of the nozzle, each movable flap assembly comprising:
      (i) an interior flap pivotally attached to the downstream end of the exhaust duct;
      (ii) an exterior flap located outwardly of the interior flap and pivotally connected to the downstream end
      (iii) a rocking lever connected to the downstream end of the exhaust duct; and
      (iv) connecting means connecting the rocking lever to the interior and exterior flaps; and,
   (c) jack screw actuators interconnecting the rocking levers to form a rigid frame around the nozzle such that movement of the jack screw means causes generally transverse movement of the rocking levers to vary the angular orientation of the interior and exterior flaps.

2. The nozzle according to claim 1 wherein each interior flap comprises first and second flap portions, each flap portion connected to the downstream end of the exhaust duct and to the rocking lever, the first and second flap portions having overlapping edge portions.

3. The nozzle according to claim 2 wherein the first and second flap portions each define a curved edge portion in sliding contact with an adjacent interior wall of the lateral wall structure such that the curved edge portions are urged into sealing contact with the interior wall by the exhaust gases passing through the nozzle.

4. The nozzle according to claim 1 wherein the means connecting the rocking lever and the associated exterior flap comprises a rod pivotally attached to the rocking lever and to the exterior flap.

5. The nozzle according to claim 1 wherein each exterior flap defines curved edge portions in sliding, sealing contact with an exterior wall of the lateral wall structure.

6. The nozzle assembly according to claim 5 wherein each exterior wall defines bifurcated portions into which the curved edge portions of the exterior flaps are slidably received.

7. The nozzle assembly according to claim 1 wherein the interior walls define generally longitudinally extending cooling passages through which cooling air passes.

8. The nozzle according to claim 1 wherein the jack screw actuators are located in the space between the interior and exterior walls.

9. The nozzle according to claim 1 wherein the jack screw actuators comprise:
 (a) a rotatable shaft having first and second portions extending from a housing, the first and second portions having opposite threads formed thereon;
 (b) first and second collars threadingly engaged with the first and second shaft portions, respectively;
 (c) means non-rotatably connecting each collar to a rocking lever; and,
 (d) means to selectively rotate the shaft.

* * * * *